(12) United States Patent
Liu et al.

(10) Patent No.: US 10,444,425 B2
(45) Date of Patent: Oct. 15, 2019

(54) ANTI-STATIC LIGHT SOURCE UNIT AND BACKLIGHT MODULE THEREOF

(71) Applicant: HON HAI PRECISION INDUSTRY CO., LTD., New Taipei (TW)

(72) Inventors: Feng-Hsiang Liu, New Taipei (TW); Te-Chang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 339 days.

(21) Appl. No.: 15/444,476

(22) Filed: Feb. 28, 2017

(65) Prior Publication Data

US 2017/0363801 A1 Dec. 21, 2017

(30) Foreign Application Priority Data

Jun. 21, 2016 (TW) .............................. 105119480 A (51) Int. Cl.
| | |
|---|---|
| *H05K 1/18* | (2006.01) |
| *F21V 8/00* | (2006.01) |
| *F21V 19/00* | (2006.01) |
| *F21V 25/00* | (2006.01) |
| *F21V 23/00* | (2015.01) |
| *F21Y 115/10* | (2016.01) |

(52) U.S. Cl.
CPC ........ *G02B 6/0083* (2013.01); *F21V 19/0015* (2013.01); *F21V 23/001* (2013.01); *F21V 25/00* (2013.01); *F21Y 2115/10* (2016.08); *G02B 6/0031* (2013.01); *G02B 6/0068* (2013.01); *G02B 6/0073* (2013.01)

(58) Field of Classification Search
CPC ................................ H05K 1/18; H05K 1/181
See application file for complete search history.

(56) References Cited

U.S. PATENT DOCUMENTS

2012/0099048 A1* 4/2012 Yamazaki ......... G02F 1/133514
349/62
2016/0300834 A1* 10/2016 Yu ....................... H01L 27/0288

* cited by examiner

*Primary Examiner* — Jeremy C Norris
(74) *Attorney, Agent, or Firm* — ScienBiziP, P.C.

(57) ABSTRACT

A light source unit in a backlight module able to resist the accumulation of static electricity includes a circuit board, a plurality of lighting elements, a plurality of conductive lines, and at least one connecting line. Each conductive line electrically connects with lighting elements. The conductive line forms a plurality of first sharp portions. A plurality of second sharp portions which are grounded are facing the first sharp portions. The first sharp portions collect static electricity and the second sharp portions cooperate with the first sharp portions to discharge the static electricity.

18 Claims, 8 Drawing Sheets

ANTI-STATIC LIGHT SOURCE UNIT AND BACKLIGHT MODULE THEREOF

CROSS-REFERENCE TO RELATED APPLICATIONS

This application claims priority to Taiwanese Patent Application No. 105119480 filed on Jun. 21, 2016, the contents of which are incorporated by reference herein.

FIELD

The subject matter herein generally relates to a backlight apparatus with light source unit.

BACKGROUND

Light emitting diodes (LEDs) are widely used in a display apparatus as a backlight module for providing light. The LEDs are electrically assembled on a circuit board, and spaced from each other. High-voltage static electricity may be created during an assembly process of the backlight module, which cause the LEDs to be damaged. Suppressing the accumulation of static electricity is required, by providing an improved structure.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to a backlight module for effectively suppressing static electricity.

Figure 1:
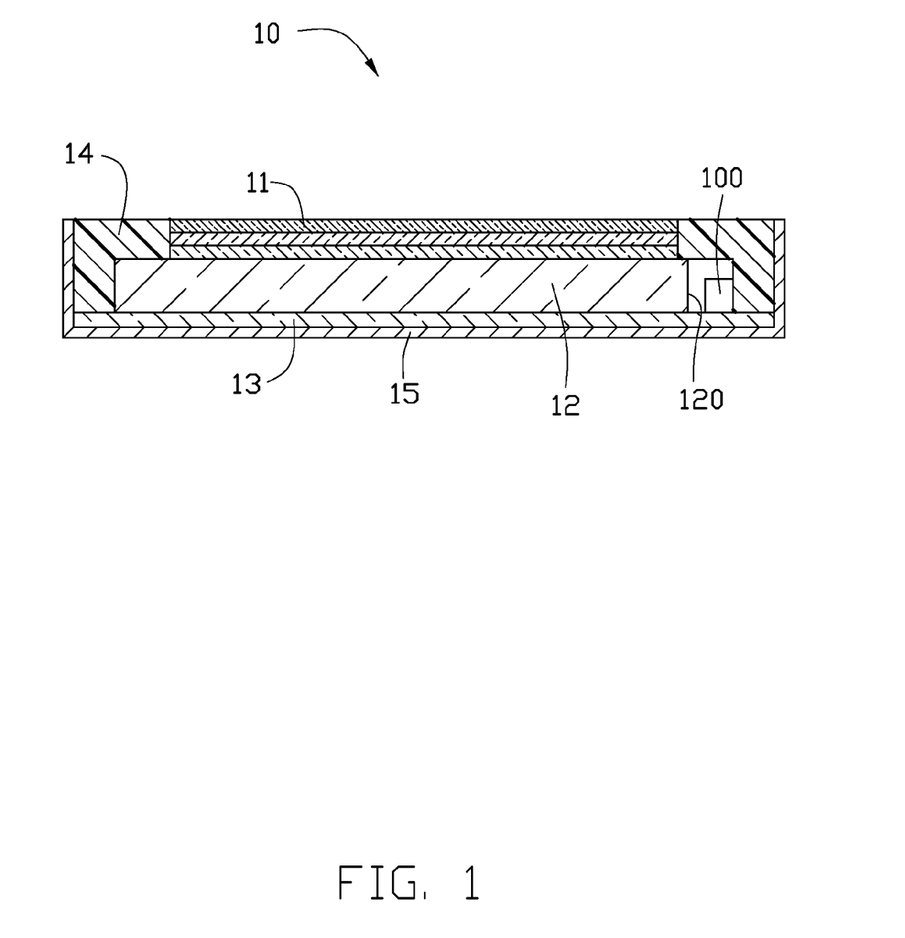
FIG. 1 is a cross-sectional view of an exemplary embodiment of a light source module, the light source module comprises a circuit board.

FIG. 1 illustrates an exemplary embodiment of a light source unit 100 used in a backlight module 10 for providing backlight. The backlight module 10 can be used in a liquid crystal display (LCD) for providing backlight. The backlight module 10 includes an optical films group 11, a light guide plate 12 with a light incident surface 120, a reflector layer 13, a frame 14, and a rear plate 15. The reflector layer 13, the light guide plate 12, and the optical films group 11 are in a cavity (not labeled) defined by the rear plate 15. The light source unit 100 faces the light incident surface 120 of the light guide plate 12. The optical films group 11, the light guide plate 12, the light source unit 100, and the reflector layer 13 are fixed in place by the frame 14. Light emitted by the light source unit 100 passes through the light guide plate 12 and the optical films group 11, and is provided to a display panel (not shown). The reflector layer 13 reflects the light leaked from a bottom surface of the light guide plate 12 back into the light guide plate 12. In at least one exemplary embodiment, the optical films group 11 includes a plurality of optical films.

Figure 2:
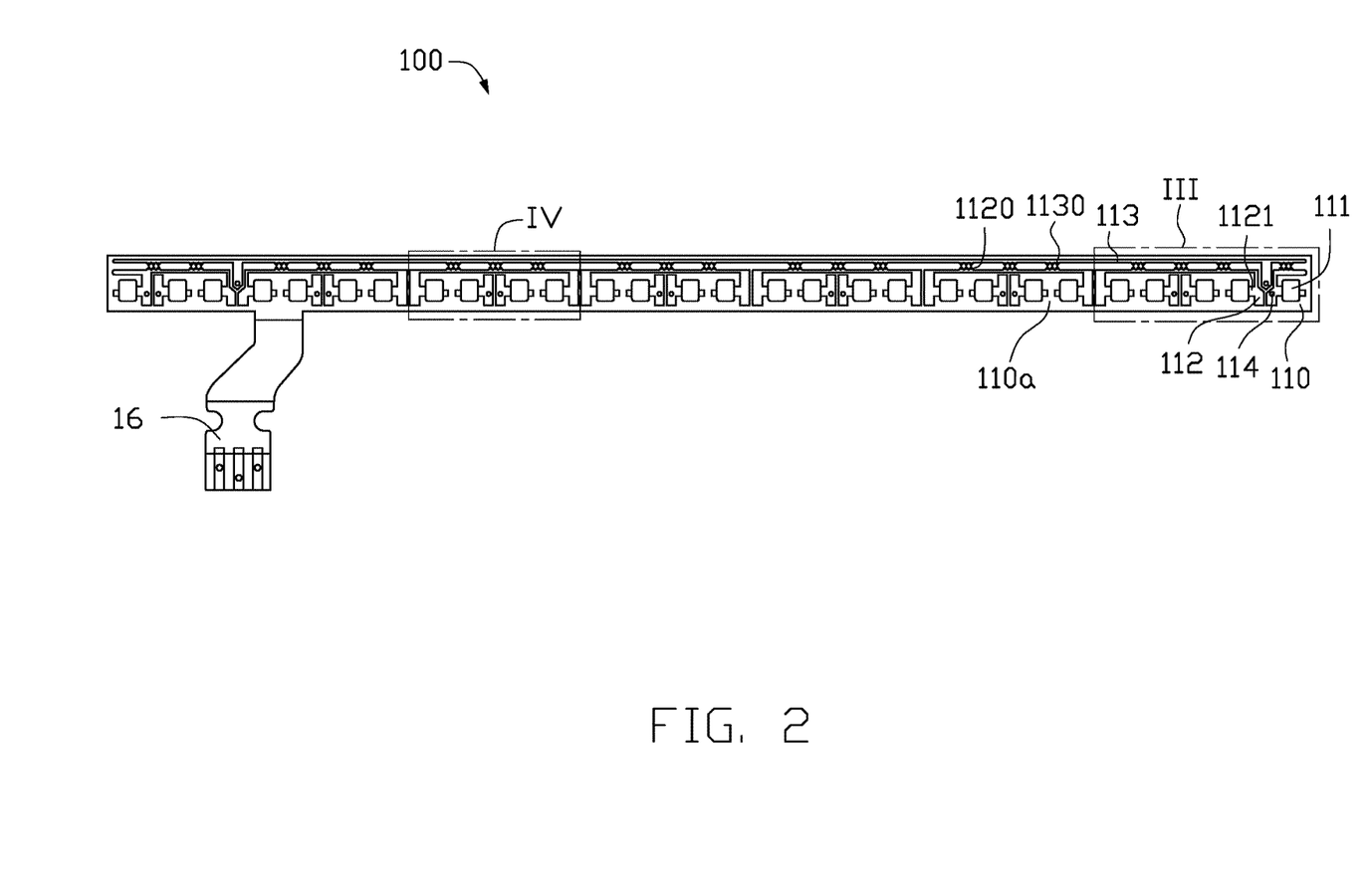
FIG. 2 is a planar view of a first exemplary embodiment of the circuit board of FIG. 1.
Figure 5:
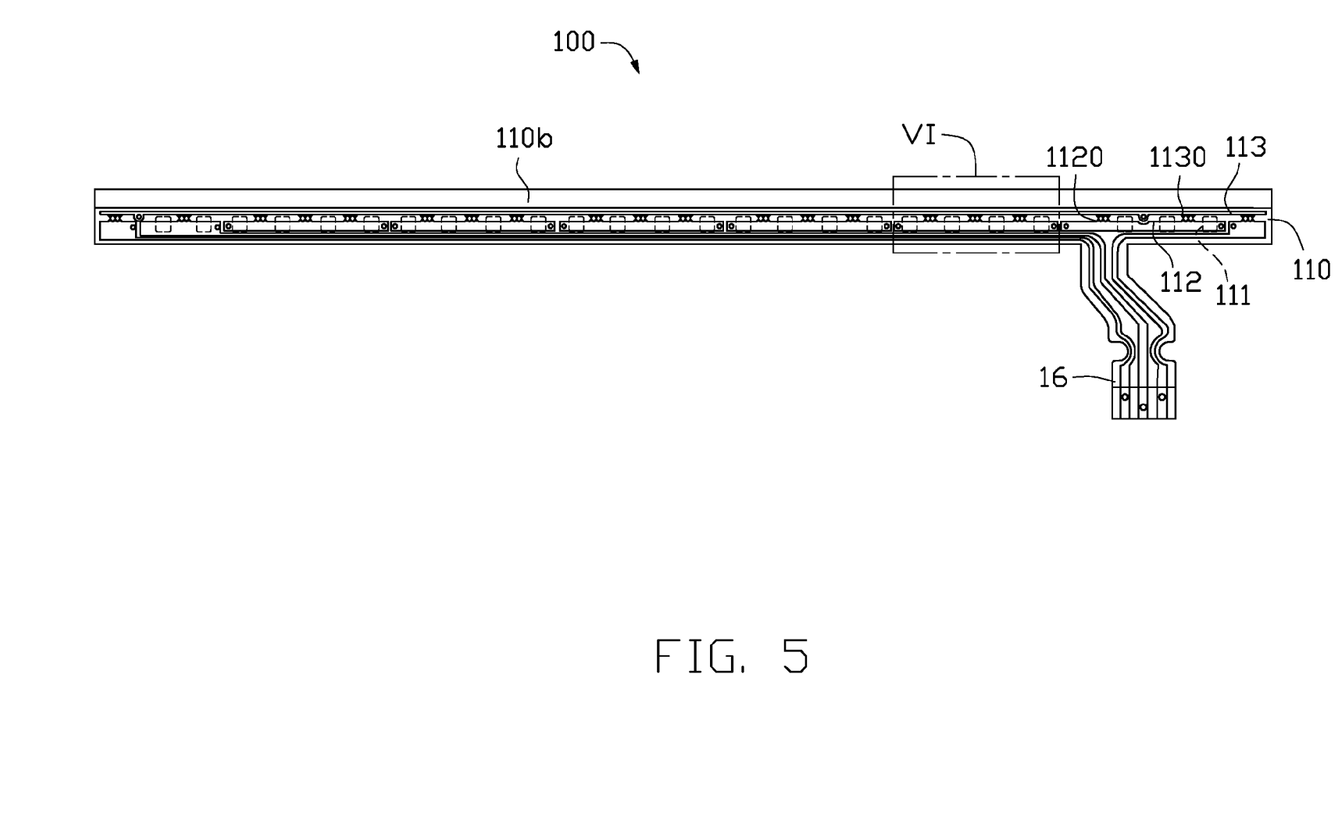
FIG. 5 is a planar view of a second exemplary embodiment of the circuit board of FIG. 1.

FIG. 2 illustrates an exemplary embodiment of the light source unit 100. The light source unit 100 includes a circuit board 110, a plurality of lighting elements 111, a plurality of conductive lines 112, and at least one connecting line 113. In at least one exemplary embodiment, the circuit board 110 can be a flexible circuit board with an insulation substrate. The circuit board 110 includes a first surface 110a and a second surface 110b (as shown in FIG. 5) facing away from the first surface 110a. In at least one exemplary embodiment, the light source unit 100 includes one connecting line 113. In another exemplary embodiment, the light source unit 100 can includes a plurality of connecting lines 113.

Figure 3:
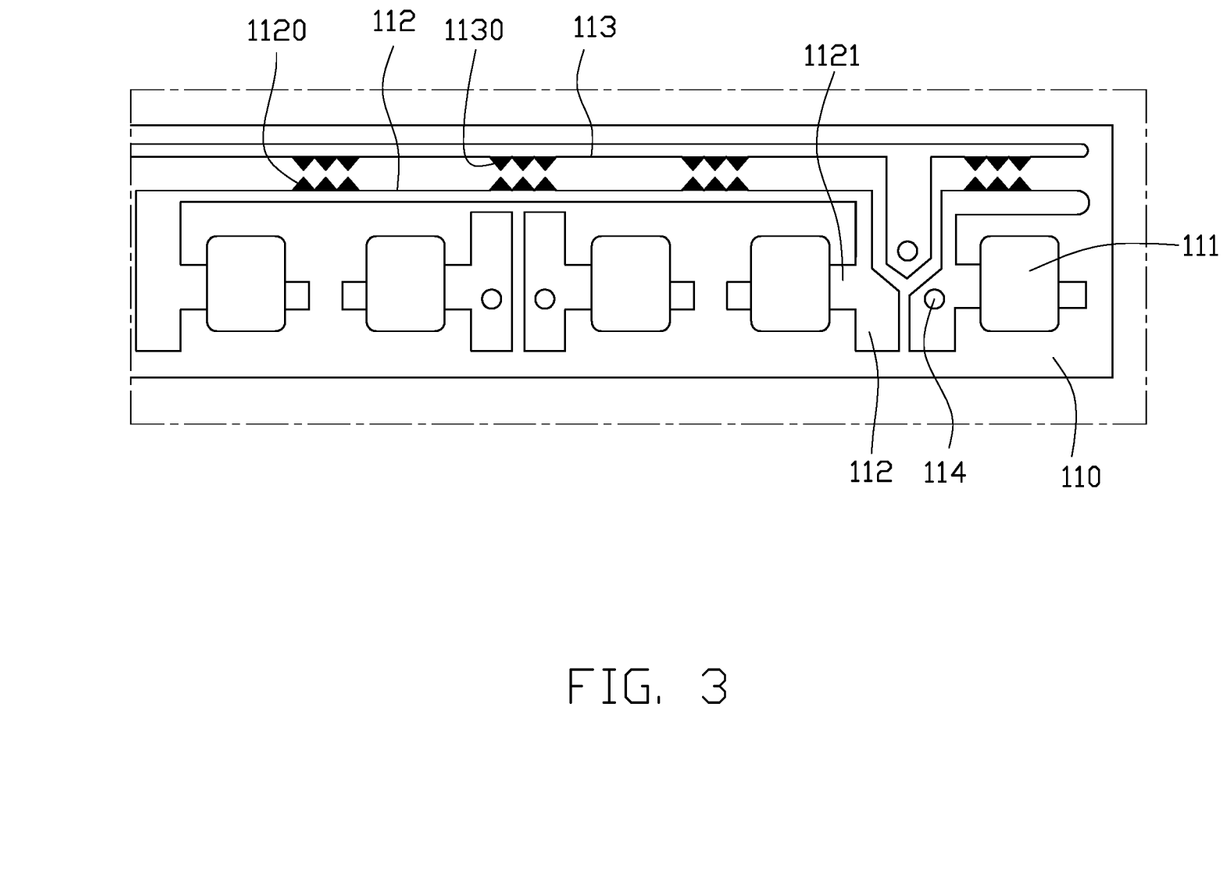
FIG. 3 is an enlarged view of circled portion III of FIG. 2.

FIG. 3 illustrates the portion of the circuit board 110 outlined as III in FIG. 2. The lighting elements 111 are located on the first surface 110a, and are spaced from each other. The lighting elements 111 are electrically connected with each other by the conductive lines 112. The lighting elements 111 are divided into groups. The lighting elements 111 in the same group are electrically connected with each other in series by a same conductive line 112. In at least one exemplary embodiment, the lighting elements 111 are arranged inline, and each group includes four lighting elements 111. The lighting elements 111 can be light emitting diodes (LEDs). In other embodiments, a number of the lighting elements 111 in different groups can be different from each other. In other embodiments, a number of the lighting element 111 in each group is variable.

Some of the conductive lines 112 are located on the first surface 110a, and the rest of the conductive lines 112 are located on the second surface 110b. The conductive lines 112 are electrically connected to an external circuit (not shown) through a flexible circuit board (FPC) 16 (as shown in FIG. 2), such as a power source. Each of the conductive lines 112 located on the first surface 110a includes a plurality of conductive pads 1121. The conductive pads 1121 are spaced from each other. The lighting elements 111 are assembled on the conductive pads 1121, and are arranged in line.

The connecting line 113 is located on the first surface 110a and is parallel with the line defined by the lighting elements 111.

The light source unit 100 further defines a plurality of via holes 114. Each of the via holes 114 extends through the circuit board 110. Each of the conductive lines 112 extends through the via hole 114 to the second surface 110b.

Figure 4:
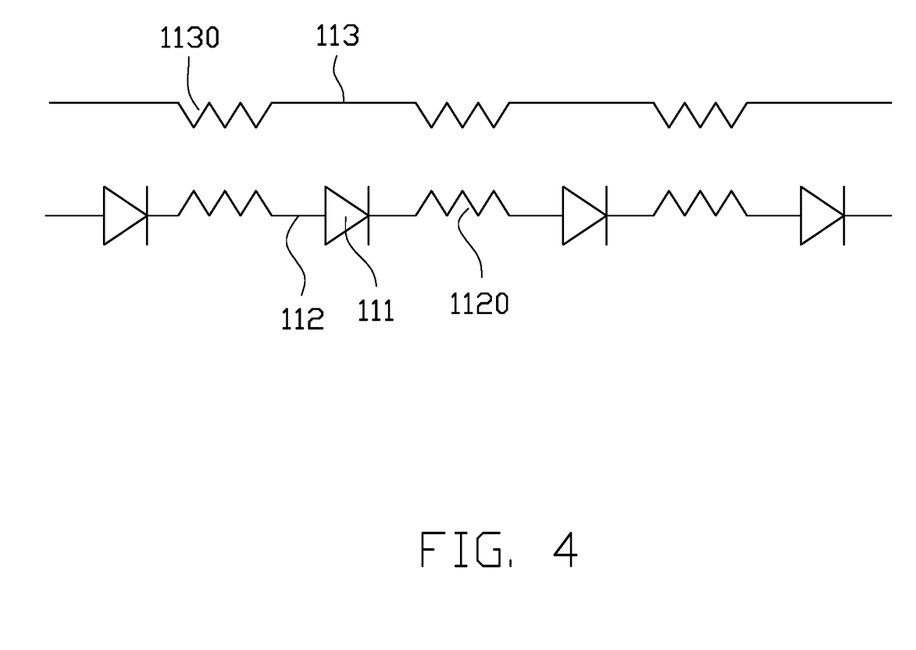
FIG. 4 is a diagram of the circuit board of FIG. 2.

The light source unit 100 further includes a plurality of first sharp portions 1120 and a plurality of second sharp portions 1130. The first sharp portions 1120 and the second sharp portions 1130 are located on the first surface 110a, and server as resistors in a circuit diagram (as shown in FIG. 4). Each of the first sharp portions 1120 is located between every two adjacent lighting elements 111 connected to the same conductive line 112. The first sharp portions 1120 are electrically connected to the conductive line 112, and collect static electricity accumulated on or by the light source unit 100. In at least one exemplary embodiment, each the first sharp portions 1120 includes a serrated edge. Each first sharp portion 1120 includes at least three first sharp ends (not labeled). In other exemplary embodiments, the first sharp ends can be a needle point, and a number of the first sharp ends can be adjusted. In at least one exemplary embodiment, portions of the conductive line 112 extend along a direction towards to the connecting line 113 to form the first sharp portions 1120. In other embodiments, the first sharp portions 1120 and the conductive lines 112 can be separately formed and then connected together.

Each of the second sharp portion 1130 faces one of the first sharp portions 1120. Each of the second sharp portions 1130 cooperates with one of the first sharp portions 1120 to discharge the accumulated static electricity. In at least one exemplary embodiment, portions of the connecting line 113 extend to the conductive line 112 to form the second sharp portions 1130. The second sharp portion 1130 is grounded. In other exemplary embodiments, the second sharp portions 1130 can be external conductive objects connected with the connecting line 113.

FIG. 5 illustrates a second exemplary embodiment of the light source unit 100. The light source unit 100 includes a circuit board 110, a plurality of lighting elements 111, a plurality of conductive lines 112, and at least one connecting line 113. In at least one exemplary embodiment, the circuit board can be a flexible circuit board, and made of insulation material. The circuit board 110 includes a first surface 110a (as shown in FIG. 2) and a second surface 110b facing away from the first surface 110a. In at least one exemplary embodiment, the light source unit 100 includes a plurality of connecting lines 113.

Figure 6:
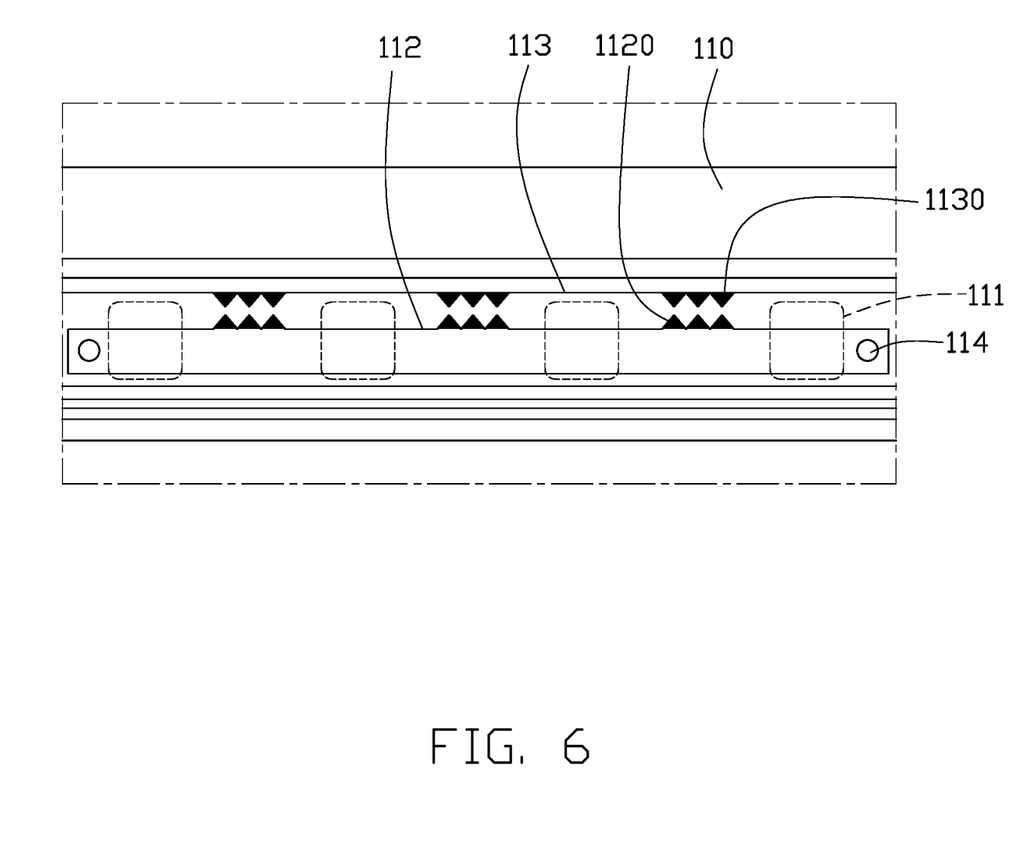
FIG. 6 is an enlarged view of circled portion VI of FIG. 5.

FIG. 6 illustrates a portion of the light source unit 100 outlined as VI in FIG. 5. The lighting elements 111 are located on the first surface 110a, and are spaced from each other. The lighting elements 111 are electrically connected with each other by the conductive line 112. The lighting elements 111 are divided into groups. The lighting elements 111 in the same group are electrically connected with each other in series by a same conductive line 112. In at least one exemplary embodiment, the lighting elements 111 are arranged in line, and each group includes four lighting elements 111. The lighting elements 111 can be light emitting diodes (LEDs). In other embodiments, a number of the lighting elements 111 in different groups can be variable.

Some of the conductive lines 112 are located on the first surface 110a, and the rest of the conductive lines are located on the second surface 110b. The conductive lines 112 are electrically connected to an external circuit (not shown) through an FPC 16 (as shown in FIG. 5), such as a power source. Each of the conductive lines 112 includes a plurality of conductive pads 1121 located on the first surface 110a. The conductive pads 1121 are spaced from each other. The lighting elements 111 are arranged in line located on the conductive pads 1121.

The connecting line 113 is located on the second surface 110b and is parallel with the line defined by the lighting elements 111.

The light source unit 100 further defines a plurality of via holes 114. Each of the via holes 114 extends through the circuit board 110. Each of the conductive lines 112 extends through the via hole 114 to the second surface 110b.

The light source unit 100 further includes a plurality of first sharp portions 1120 and a plurality of second sharp portions 1130. The first sharp portions 1120 and the second sharp portions 1130 are located on the second surface 110b. A projection of each of the first sharp portions 1120 on the first surface 110a is located between every two adjacent lighting elements 111 connected to the same conductive line 112. The first sharp portions 1120 are electrically connected to the conductive line 112 and collect static electricity of the light source unit 100. In at least one exemplary embodiment, each of the first sharp portion 1120 includes a serrated edge. Each first sharp portion 1120 includes at least three first sharp ends (not labeled). In other exemplary embodiments, the first sharp ends can be a needle point, and a number of the first sharp ends can be variable. In at least one exemplary embodiment, portions of the conductive line 112 extend along a direction towards the connecting line 113 to form the first sharp portions 1120. In other embodiments, the first sharp portions 1120 and the conductive lines 112 can be separately formed and then connected.

The second sharp portion 1130 faces the first sharp portion 1120. Each of the second sharp portions 1130 cooperates with one of the first sharp portions 1120 to discharge static electricity of the light source unit 100. In at least one exemplary embodiment, portions of the connecting line 113 extend to the conductive line 112 to form the second sharp portions 1130. The second sharp portion 1130 is grounded. In other exemplary embodiments, the second sharp portions 1130 can be external conductive objects connected with the connecting line 113.

Figure 7:
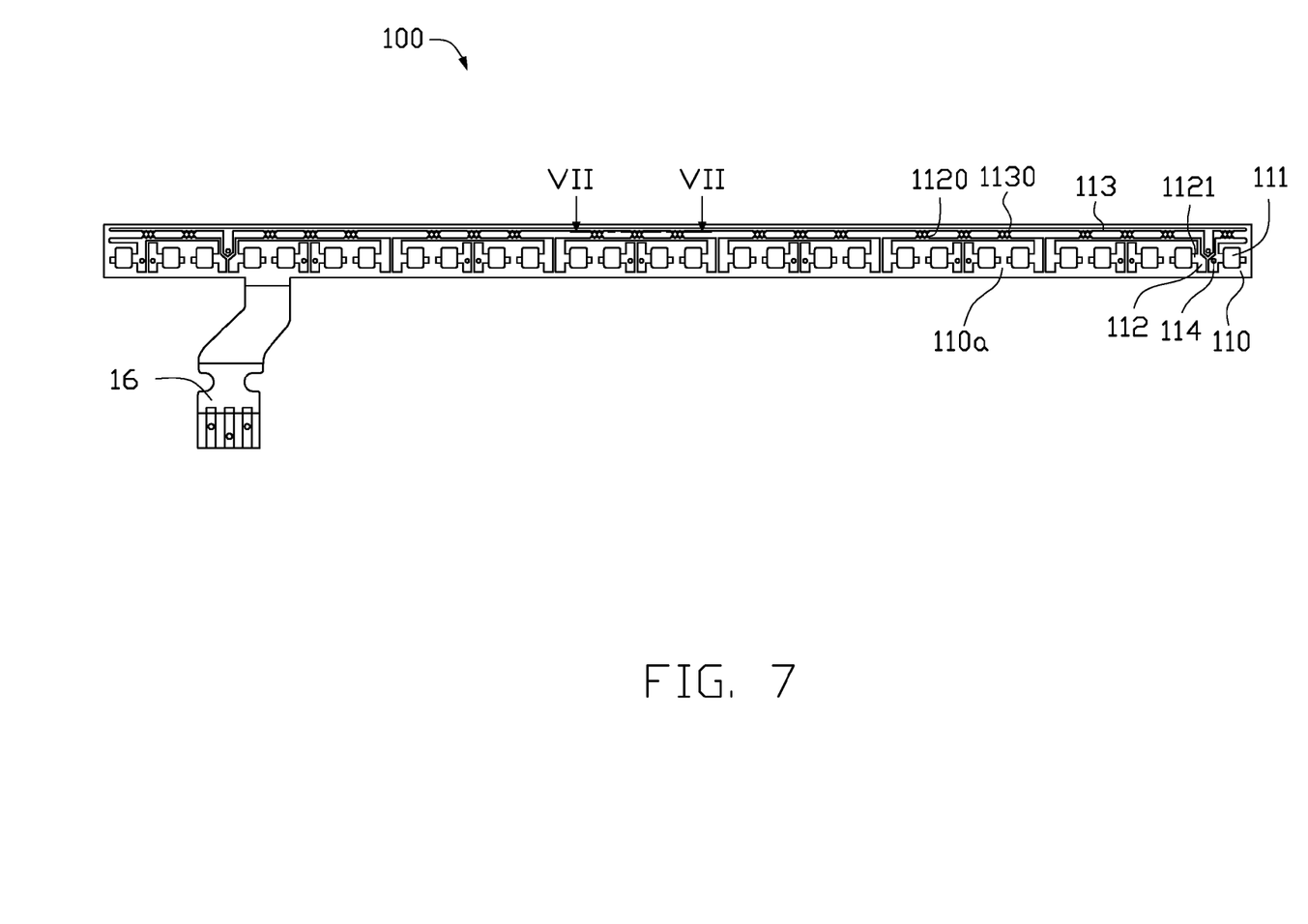
FIG. 7 is a planar view of a third exemplary embodiment of the circuit board of FIG. 1.
Figure 8:
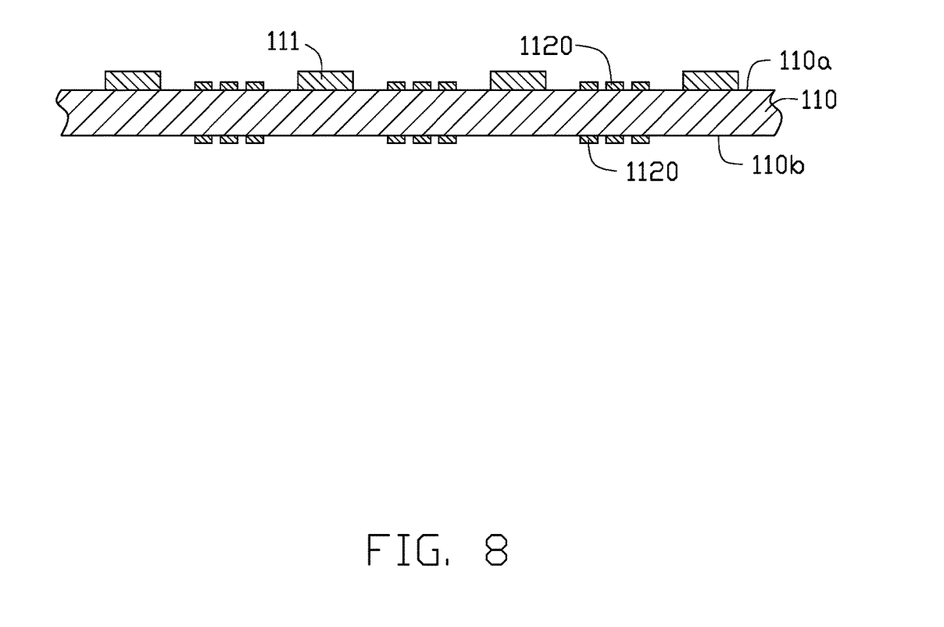
FIG. 8 is an enlarged cross-sectional view the circuit board of FIG. 7, taken along line VII-VII.

FIG. 7 illustrates a third exemplary embodiment of the light source unit 100. The light source unit 100 includes a circuit board 110, a plurality of lighting elements 111, a plurality of conductive lines 112, and two connecting lines 113. In at least one exemplary embodiment, the circuit board can be a flexible circuit board, and made of insulation material. The circuit board 110 includes a first surface 110a and a second surface 110b (as shown in FIG. 8) facing away from the first surface 110a. The second surface 110b is parallel with the first surface 110a. In another exemplary embodiment, the light source unit 100 can includes a plurality of connecting lines 113.

FIG. 8 illustrates the light source unit 100. The lighting elements 111 are located on the first surface 110a and spaced from each other. The lighting elements 111 are electrically connected with each other by the conductive line 112. The lighting elements 111 are divided into groups. The lighting elements 111 in a same group are electrically connected with each other in series by a same conductive line 112. In at least one exemplary embodiment, the lighting elements 111 are arranged in line, and each group includes four lighting elements 111. The lighting elements 111 can be light emitting diodes (LEDs). In other embodiments, a number of the lighting elements 111 in each group can be variable.

Some of the conductive lines 112 are located on the first surface 110a, and the rest of the conductive lines 112 are located on the second surface 110b. The conductive lines 112 are electrically connected to an external circuit (not shown) through FPC 16 (as shown in FIG. 7), such as a power source. Each of the conductive lines 112 includes a plurality of conductive pads 1121. The conductive pads 1121 are spaced from each other. The lighting elements 111 are arranged in line located on the conductive pads 1121.

Some of the connecting lines 113 are located on the first surface 110a, and a rest of the connecting lines 113 are located the second surface 110b. The connecting lines 113 located on the first surface are parallel with the line defined by the lighting elements 111.

The light source unit 100 further defines a plurality of via holes 114. Each of the via holes 114 extends through the circuit board 110. Each of the conductive lines 112 extends through the via hole 114 to the second surface 110b.

The light source unit 100 further includes a plurality of first sharp portions 1120 and a plurality of second sharp portions 1130. The first sharp portions 1120 are located on the first surface 110a and the second surface 110b. The second sharp portions 1130 are located on the first surface 110a and the second surface 110b. Each of the first sharp portions 1120 located on the first surface 110a is located between two adjacent lighting elements 111 connected to a same conductive line 112. The first sharp portions 1120 are electrically connected to the conductive line 112, and collect static electricity of the light source unit 100. In at least one exemplary embodiment, each first sharp portion 1120 includes a serrated edge. Each first sharp portion 1120 includes at least three first sharp ends (not labeled). In other exemplary embodiments, the first sharp ends can be a needle point, and a number of the first sharp ends is variable. In at least one exemplary embodiment, portions of the conductive lines 112 extend along a direction towards the connecting line 113 to form the first sharp portions 1120. In other embodiments, the first sharp portions 1120 and the conductive lines 112 can be separately formed and then connected together.

The second sharp portion 1130 faces the first sharp portion 1120. The second sharp portion 1130 and the first sharp portion 1120 cooperate with each other to discharge the static electricity of the light source unit 100. In at least one exemplary embodiment, portions of the connecting line 113 extend to the conductive line 112 to form the second sharp portions 1130. The second sharp portion 1130 is grounded. In other exemplary embodiments, the second sharp portions 1130 can be external conductive objects connected with the connecting line 113 adjacent to the lighting element 111.

In another embodiment, all of the lighting elements 111 are connected with the same conductive line 112, and the first sharp portion 1120 can be selectively arranged on portions of the lighting elements 111, such as at the ends of the conductive line 112.

The first sharp portions 1120 and the second sharp portions 1130 of this disclosure are respectively portions of the conductive line 112 and the connecting line 113. The areas of the circuit board 110 required for laying out the conductive line 112 and the at least one connecting line 113 are reduced. Static electricity is evenly distributed on the lighting elements 111, thus the lighting elements 111 are protected from being damaged by the static electricity.

While various exemplary and preferred exemplary embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A light source unit in a backlight module, the light source unit comprising:
a circuit board with a first surface and a second surface facing away from the first surface;
a plurality of lighting elements located on the first surface and configured to emit light;
a plurality of conductive lines;
at least one connecting line parallel to the conductive lines;
a plurality of first sharp portions located on the conductive lines, and configured to collect static electricity; and
a plurality of second sharp portions located on the at least one connecting line and configured to cooperate with the first sharp portions to discharge the static electricity;
wherein each of the conductive lines electrically connects with portions of the lighting elements in line; the second sharp portions respectively face the first sharp portions,
the first sharp portions and the second sharp portions are located on a same surface of the circuit board; the lighting elements are electrically connected with each other by the conductive lines where the first sharp portions are located; the second sharp portions electrically connected by the at least one connecting line are grounded, and are insulated from the lighting elements.

2. The light source unit of claim 1, wherein the first sharp portions and the second portions are located on the first surface; each of the first sharp portions is located between every two adjacent lighting elements connected to the same conductive line.

3. The light source unit of claim 1, wherein the first sharp portions are symmetrically located on the first surface and the second surface; the second sharp portions are symmetrically located on the first surface and the second surface; each of the first sharp portions located on the first surface is located between every two adjacent lighting elements connected to a same conductive line.

4. The light source unit of claim 1, wherein each of the conductive lines comprises a plurality of conductive pads; the conductive pads are located on the first surface; the lighting elements respectively are located on the conductive pads.

5. The light source unit of claim 1, wherein each of the conductive lines extends through the circuit board to be on the second surface.

6. The light source unit of claim 5, wherein the light source unit further defines a plurality of via holes; each of the via holes extends through the circuit board; each of the conductive lines extends through the via hole to be on the second surface.

7. The light source unit of claim 1, wherein the conductive line extends along a direction towards the at least one connecting line to form the first sharp portions.

8. The light source unit of claim 1, wherein the at least one connecting line extends along a direction towards to the conductive line to form the second sharp portions.

9. A backlight module for providing a backlight, the backlight module comprising:
  an optical film layer;
  a light guide plate located on a surface of the optical film layer, and configured to guide light to emit into the optical film layer;
  a reflector layer configured to reflect a leakage light of the light guide plate back into the light guide plate;
  a frame configured to frame the optical film layer, the light guide plate, and the reflector layer; and
  a light source unit located on a side of the light guide plate, and configured to generate light, the light source unit comprising:
    a circuit board with a first surface and a second surface parallel to the first surface;
    a plurality of lighting elements located on the first surface, and configured to emit light;
    a plurality of conductive lines parallel to each other;
    at least one connecting line parallel to the conductive lines;
    a plurality of first sharp portions located on the conductive lines, and configured to collect static electricity; and
    a plurality of second sharp portions located on the at least one connecting line, and configured to cooperate with the first sharp portions to discharge the static electricity;
  wherein each of the at least one conductive line electrically connects with portions of the lighting elements in line; the second sharp portions respectively face the first sharp portions.

10. The backlight module of claim 9, wherein the first sharp portions and the second portions are located on the first surface; each of the first sharp portions is located between every two adjacent lighting elements connected to the same conductive line.

11. The backlight module of claim 9, wherein the first sharp portions and the second portions are located on the second surface; a projection of each of the first sharp portions on the first surface is located between every two adjacent lighting elements connected to the same conductive line.

12. The backlight module of claim 9, wherein the first sharp portions are symmetrically located on the first surface and the second surface; the second sharp portions are symmetrically located on the first surface and the second surface; each of the first sharp portions located on the first surface is located between every two adjacent lighting elements connected to a same conductive line.

13. The backlight module of claim 9, wherein each of the conductive lines comprises a plurality of conductive pads; the conductive pads are located on the first surface;
  the lighting elements respectively are located on the conductive pads.

14. The backlight module of claim 9, wherein each of the conductive lines extends through the circuit board to be on the second surface.

15. The backlight module of claim 14, wherein the light source unit further defines a plurality of via holes; each of the via holes extends through the circuit board; each of the conductive lines extends through the via hole to be located on the second surface.

16. The backlight module of claim 9, wherein the conductive line extends along a direction towards the at least one connecting line to form the first sharp portions.

17. The backlight module of claim 9, wherein the at least one connecting line extends along a direction towards to the conductive line to form the second sharp portions.

18. The backlight module of claim 9, wherein the first sharp portions and the second sharp portions are located on a same surface of the circuit board; the lighting elements are electrically connected with each other by the conductive lines where the first sharp portions are located; the second sharp portions electrically connected by the at least one connecting line are grounded, and are insulated from the lighting elements.

* * * * *